United States Patent [19]
Parikh et al.

[11] Patent Number: 5,379,071
[45] Date of Patent: Jan. 3, 1995

[54] METHOD OF ENCODING A LOCATION OF CHANGES IN A SEQUENCE OF VIDEO IMAGES

[75] Inventors: Shrikant N. Parikh, Mesquite; Hari N. Reddy, Grapevine, both of Tex.

[73] Assignee: IBM Corporation (International Business Machines Corporation), Armonk, N.Y.

[21] Appl. No.: 991,232

[22] Filed: Dec. 16, 1992

[51] Int. Cl.$^6$ ............................................. H04N 7/137
[52] U.S. Cl. .................................... 348/409; 348/715; 348/717
[58] Field of Search ................. 358/13, 133, 135, 136; H04N 7/137; 348/409, 715, 716, 717

[56] References Cited

U.S. PATENT DOCUMENTS 5,193,001  3/1993  Kerdranvrat ........................ 358/136

OTHER PUBLICATIONS

Lancon, E., et al. Activity Detection. IBM TDB No. 7B, Dec. 1991, pp. 217–219.
Feig, E., et al. DCT Interpolation for Motion Video. Research Disclosure No. 322, Feb. 1991.
Rutherfoord, T., et al. Differential Image Compression Algorithm. IBM Patent Application Docket No. BC992002, Jan. 1992.
Nadas, A. J. Compression of Video Data via Three Dimensional Bandwidth Reduction. IBM TDB, Apr. 1977, pp. 4207–4210.
Dinan, R. F., et al. Document Image Processing System. IBM Patent Application Docket No. CT986009.
Appel, A., et al. Cyclic Video Region Transmission. IBM Patent Application Docket No. Y0988056.
Choi, S., et al. Frame Buffer Control For Real-Time Image Decompression. IBM Patent Application Docket No. Y0991093.
Viscito, E. E., et al. Frame-to-Frame Bit Allocation Strategy For Fixed-Bit-Rate Video Compression Algorithms Employing Motion Compensation. IBM Patent Application Docket No. Y0991128.

*Primary Examiner*—Howard W. Britton
*Attorney, Agent, or Firm*—A. Bruce Clay

[57] ABSTRACT

The present invention divides a video frame into a series of smaller and smaller quadrants until reaching a single pixel size. By issuing a series of commands, a logical cursor moves within the quadrants to evaluate the frame for changes from the previous frame. Upon detecting a color change, the exact location (identified by a level and a quadrant thereof) is encoded along with a value for the change. As a result of the novel approach disclosed herein, there may be significant storage savings over the prior art.

9 Claims, 13 Drawing Sheets

LEVEL 0   FOUR 512 X 512 PIXEL QUADRANTS
          MD                                    MD
           ↓
LEVEL 1   EACH ONE OF THE 512 X 512 PIXEL QUADRANTS
          DIVIDED INTO FOUR 256 X 256 PIXEL QUADRANTS
          MD                                    MD
           ↓
LEVEL 2   EACH ONE OF THE 256 X 256 PIXEL QUADRANTS
          DIVIDED INTO FOUR 128 X 128 PIXEL QUADRANTS
          MD                            MD
           ↓
LEVEL 3   EACH ONE OF THE 120 X 120 PIXEL QUADRANTS
          DIVIDED INTO FOUR 64 X 64 PIXEL QUADRANTS
          MD                            MD
           ↓
LEVEL 4   EACH ONE OF THE 64 X 64 PIXEL QUADRANTS
          DIVIDED INTO FOUR 32 X 32 PIXEL QUADRANTS
          MD                       MD
           ↓
LEVEL 5   EACH ONE OF THE 32 X 32 PIXEL QUADRANTS
          DIVIDED INTO FOUR 16 X 16 PIXEL QUADRANTS
          MD              MD
           ↓
LEVEL 6   EACH ONE OF THE 16 X 16 PIXEL QUADRANTS
          DIVIDED INTO FOUR 8 X 8 PIXEL QUADRANTS
          MD         MD
           ↓
LEVEL 7   EACH ONE OF THE 8 X 8 PIXEL QUADRANTS
          DIVIDED INTO FOUR 4 X 4 PIXEL QUADRANTS
          MD       MD
           ↓
LEVEL 8   EACH ONE OF THE 4 X 4 PIXEL QUADRANTS
          DIVIDED INTO FOUR 2 X 2 PIXEL QUADRANTS

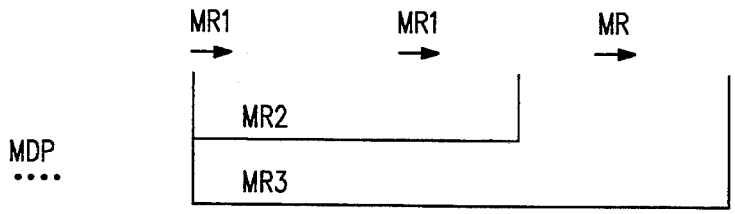

*FIG. 4*

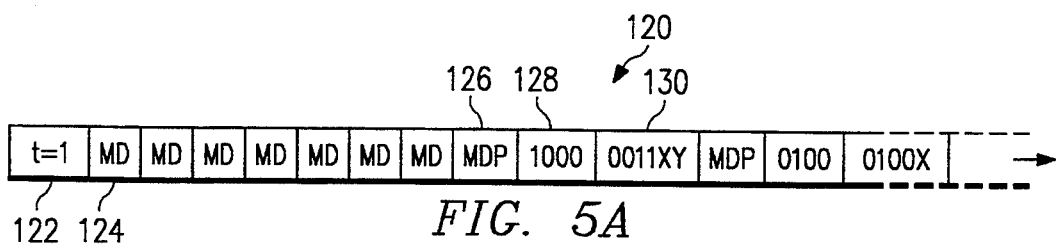

*FIG. 5A*

| | COMMAND | LEVEL | BLOCK |
|---|---|---|---|
| FRAME NUMBER: t | MD | 1 | 512X512 |
| | MD | 2 | 256X256 |
| | MD | 3 | 128X128 |
| | MD | 4 | 64X64 |
| | MD | 5 | 32X32 |
| | MD | 6 | 16X16 |
| | MD | 7 | 8X8 |
| 201 → MDP | | 8 | 4X4 |
| 202 → 1000 | | | |
| → 0011 X Y | | | 2X2 |
| 204 → MDP | | 8 | 4X4 |
| 222 → 0100 | | | |
| → 0100 X | | | 2X2 |
| 224 → MR1 | | 7 | 8X8 |
| 226 → MDP | | 8 | 4X4 |
| 228 → 0101 | | | |
| 238 → 1010 X Y | | | 2X2 |
| 248 → 0101 X Y | | | 2X2 |
| . . . . | | 6 | 16X16 |
| 258 → MD | | 7 | 8X8 |
| 120 → 260 → MR2 | | 7 | 8X8 |
| 262 → MDP | | 8 | 4X4 |
| 264 → 0001 | | | |
| 274 → 0101 X Y | | | 2X2 |
| . . . . | | 6 | 16X16 |
| 278 → MU | | 7 | 8X8 |
| 280 → MR1 | | 7 | 8X8 |
| 282 → MD | | 7 | 8X8 |
| 290 → MR3 | | 7 | 8X8 |
| 294 → MDP | | 8 | 4X4 |
| 296 → 0001 | | | |
| 306 → 0101 X Y | | | 2X2 |
| 310 → MU2 | | 5 | 32X32 |
| 312 → MU2 | | 3 | 128X128 |
| 314 → MU2 | | 1 | 512X512 |
| 316 → MU | | 0 | 1024X1024 |

*FIG. 5B*

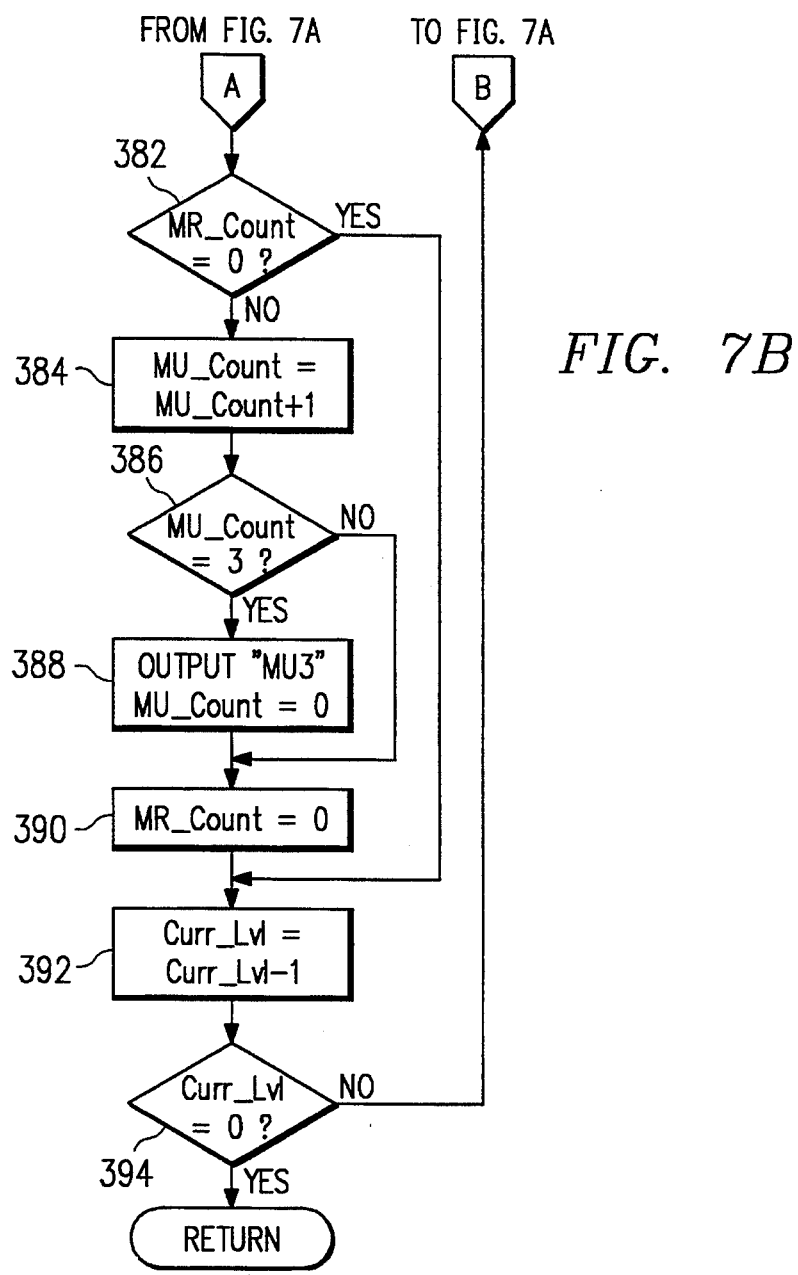

METHOD OF ENCODING A LOCATION OF CHANGES IN A SEQUENCE OF VIDEO IMAGES

TECHNICAL FIELD OF THE INVENTION

This invention relates in general to the digitizing of video images, and in particular to a method of encoding a location of changes in a sequence of video images.

BACKGROUND OF THE INVENTION

Digitizing analog data is a technique well-known in the art. There are many advantages available with the use of digitized data that are not available with analog data. Such advantages include longer life without degradation of the data, ease of manipulation of the data, ease of transmission of the data, ease of storage of the data, availability of digital computer processing, and etc. thus, it is frequently preferable to convert analog data into digital data.

For example, video data that is digitized is of higher quality and will last longer without degradation than the analog version thereof. Thus, the conversion of analog video such as is found on a video cassette recorder (VCR) tape into digital video such as is found on a video disk will improve the quality and life of the video. Unfortunately, uncompressed digital video requires storage rates greater than 20 megabytes per second. Such a large storage requirement imposes a burden which makes the storage, retrieval, and transmission of uncompressed digitized video infeasible. Therefore, it is highly advantageous to compress video when digitizing.

The efficient compression of continuous motion digital video is a fundamental problem in this emerging field of computing. There are several known compression techniques in the art which exploit a large amount of redundancy that exists within a frame and between two consecutive frames. The basic idea is, after describing in full detail one image, a second and consecutive image is described by adding only the change (delta) from the first image to the second image. After these changes are applied to the first image, the second frame can be fully created. In known techniques, by virtue of a great deal of commonality between two consecutive images, the information needed to describe the change is typically significantly less than the information needed to describe the second image. For the purpose of describing the image and comparing two consecutive images, each image is divided into an array of blocks. The difference in two images is described by means of describing the change (delta) in two corresponding blocks in two consecutive frames. Each of these blocks is at the same position (i.e., having the same x,y coordinates) in the two frames. For a frame of 800 pixels×800 pixels, the entire image can be divided into 10,000 blocks each of which is an 8 pixel×8 pixel area. Alternatively, it can be divided into 80×80 (6,400) blocks each of which is 10 pixels ×10 pixels in size.

In an image consisting of a few thousand blocks, most of the blocks will not change from the first frame to the next. In one approach in the prior art, the following format is used:

| Block No. | Change |
| --- | --- |
| 0 | No |
| 1 | Yes:Delta |
| 2 | No |

| Block No. | Change |
| --- | --- |
| . | . |
| . | . |
| . | . |
| etc. | etc. |

In this format, each change is described one block at a time. If there is no change for a block, a flag is present indicating that there is no change for that block. This scheme has the obvious disadvantage in that regardless of whether a change is present or not, a flag is needed. For example, in a 10,000 block image, if only 100 blocks have a change, 9,900 flags will be needed to indicate that there is no change for those blocks. This implies a minimum of 1,200K bytes of storage space per frame.

An obvious improvement to the previous scheme is to eliminate the flags where no change is present. In this scheme, only those blocks where the changes are present are included. The individual block having a change therein is identified by its x,y coordinate. Each x,y coordinate identification will consume approximately 14 bits. For the case where 100 blocks (approximately 1% of a frame) have changed, the overhead for the block identification will be 1,400 bits (approximately 200 bytes). For the case where 5% of the blocks have change, this overhead will jump to 900 bytes (approximately 1K bytes) per frame. These known methods require too much storage per frame. Thus, there is a need for a method of encoding a location of changes in a sequence of video frames which reduces the amount of overhead required.

SUMMARY OF THE INVENTION

The present invention provides a method of encoding a location of changes in a sequence of video images (frames) which substantially reduces the storage overhead of the prior art. The present invention uses a clockwise quadrant search through a plurality of levels to identify changes from frame to frame.

In accordance with one aspect of the present invention, a method of encoding a location of change in a video frame from a previous frame is provided. The video frame is subdivided into a plurality of levels, each comprising progressively smaller quadrants down to a predefined size. A change location is then identified by a level and a quadrant therein.

In accordance with another aspect of the present invention, a logical cursor is maneuvered from level to level and quadrant to quadrant by a predefined pattern. Any changes are identified by the cursor during this maneuvering. The predefined pattern comprises moving clockwise from one quadrant to a next in a level and then moving to a lower level if a change is detected in any of the quadrants. Upon reaching the lowest predefined level, a change is then encoded.

It is a technical advantage of the present invention that storage overhead for encoded compression commands is reduced.

BRIEF DESCRIPTION OF THE DRAWINGS

For a more complete understanding of the present invention and the advantages thereof, reference is now made to the Detailed Description taken in conjunction with the attached Drawings, in which:

FIG. 4 further illustrates the levels in accordance with the present invention;

FIGS. 5A and 5B illustrate an encoded command in conjunction with FIGS. 2B, 2C, and 2D;

FIGS. 7A and 7B are more detailed flowcharts of the processing of the frame data of FIG. 6;

DETAILED DESCRIPTION OF THE INVENTION

Figure 1A:
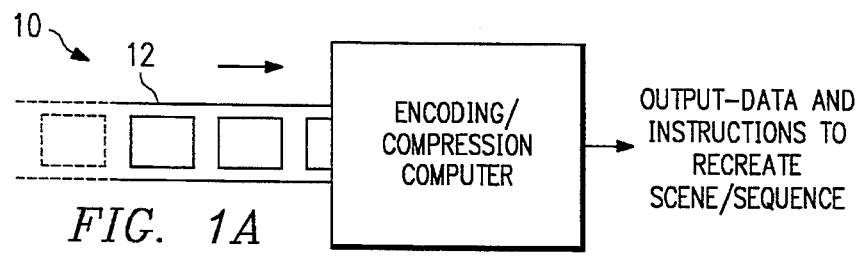
FIGS. 1A and 1B schematically illustrate video compression hardware.
Figure 1B:
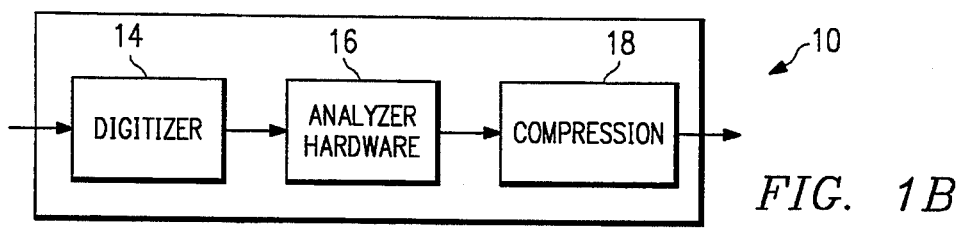

Referring to FIGS. 1A and 1B, a schematic illustration of an encoding/compression computer 10, as is known in the art, is shown for use with the present invention. An analog video 12 is used as input to the encoding/compression computer 10. As a result of manipulations within the computer 10, output data and instructions to recreate a scene/sequence of scenes is produced by the computer 10. In FIG. 1B, the computer 10 is illustrated in further detail. The computer 10 comprises a digitizer 14, analyzer hardware 16, and a compression method 18 used to compress the video 12.

Compression includes the encoding of changes in a scene from frame-to-frame. Thus, after an initial frame is encoded, a subsequent frame is encoded to include a change from the previous frame. The present invention describes an improved method for encoding the changes between frames.

Figure 2A:
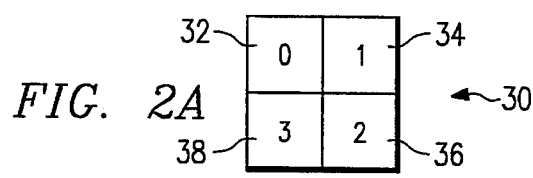
FIGS. 2A, 2B, 2C, and 2D illustrate the levels within which the present invention operates.

Referring to FIG. 2A, a single video frame 30 comprising 1,024 bits×1,024 bits is shown divided into four quadrants. The four quadrants are identified as (starting from the upper left and moving clockwise) a zero quadrant 32, a one quadrant 34, a two quadrant 36, and a three quadrant 38. Each quadrant 32, 34, 36, and 38 is similarly subdivided into four quadrants and each of those quadrants is then subdivided into four quadrants and so on until reaching a lowest level in accordance with the present invention. When the present invention is utilized to compress a video frame, each frame is checked for changes in comparison to the previous frame using a clockwise search starting with the upper left quadrant at each sequential level, as will be subsequently described in greater detail.

Figures 2B, 2C:
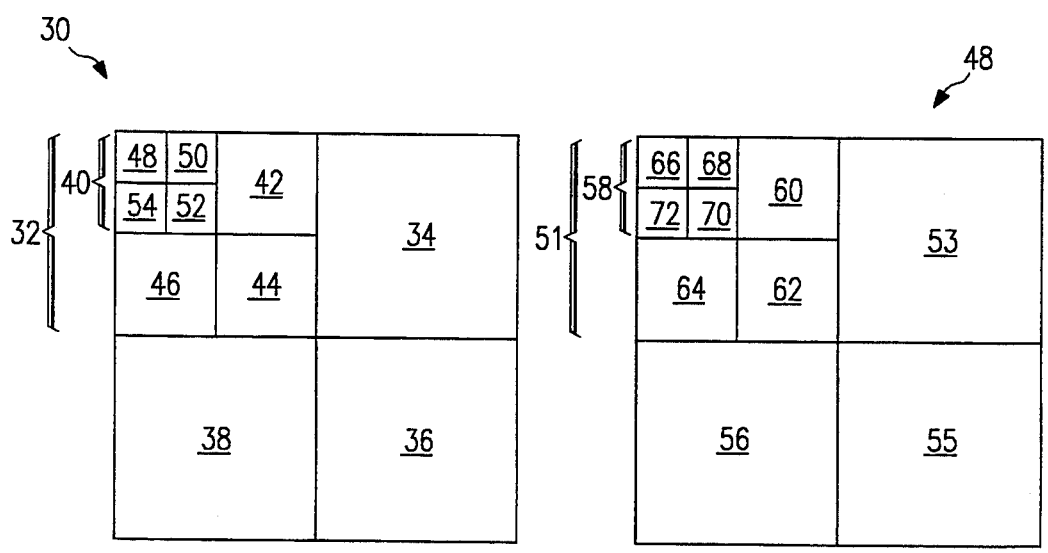
Figure 2D:
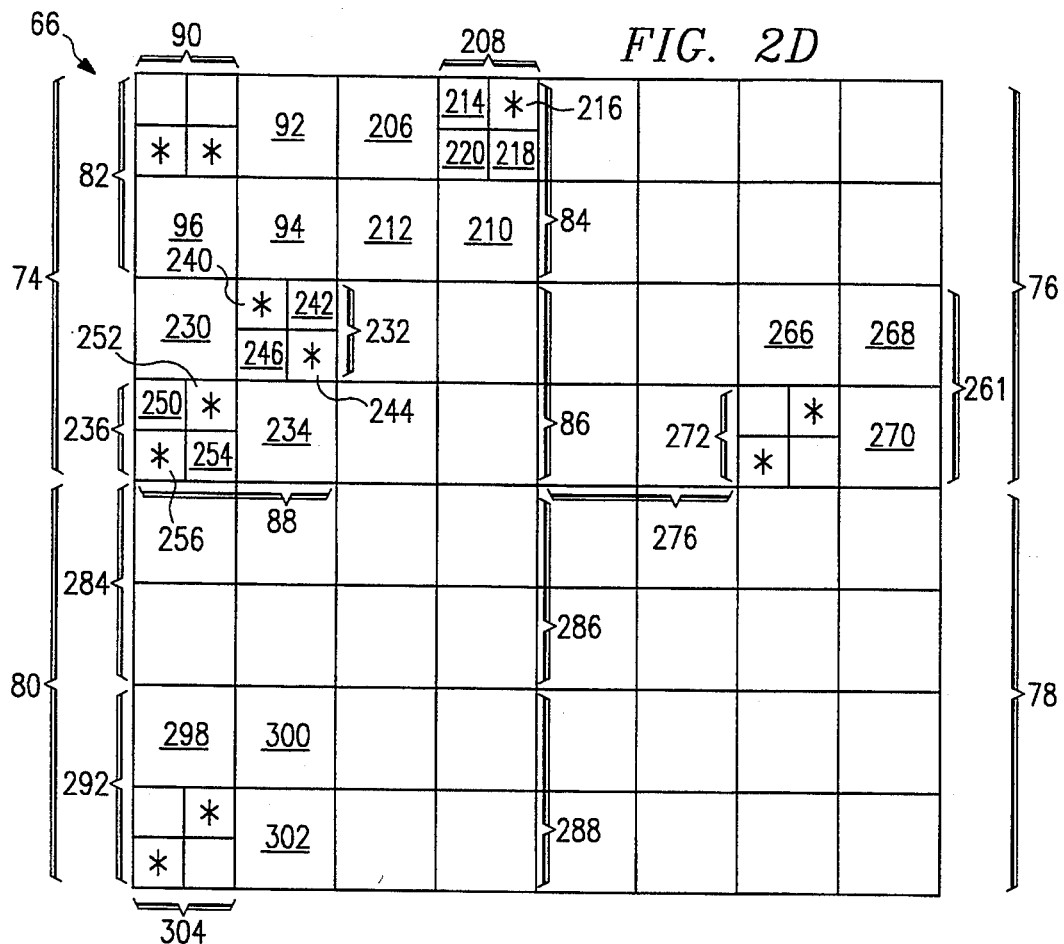

Referring to FIGS. 2B, 2C, and 2D, the video frame 30 is divided into sequentially smaller quadrants. In FIG. 2B, the frame 30 is divided into the four quadrants 32, 34, 36, and 38, as previously described above, and comprising 512 bits ×512 bits each. The quadrants 32, 34, 36, and 38 are then divided into four smaller quadrants comprising 256 bits×256 bits each. For example, the zero quadrant 32 is divided into a zero quadrant generally identified by the reference numeral 40, a one quadrant identified by the reference numeral 42, a two quadrant identified by the reference numeral 44, and a three quadrant identified by the reference numeral 46. Each quadrant 40, 42, 44, and 46 is then again divided into four quadrants comprising 128 bits×128 bits each such as, for example, the zero quadrant 40 is divided into a zero quadrant 48, a one quadrant 50, a two quadrant 52, and a three quadrant 54.

Referring to FIG. 2C, the zero quadrant 48 is shown enlarged (for the sake of clarity) and again subdivided. The zero quadrant 48 is divided into a zero quadrant 51, a one quadrant 53, a two quadrant 55, and a three quadrant 56 each comprising 64 bits×64 bits. Each quadrant 51, 53, 55, and 56 is then subdivided into four quadrants comprising 32 bits×32 bits each. For example, the zero quadrant 51 is divided into a zero quadrant 58, a one quadrant 60, a two quadrant 62, and a three quadrant 64. Each quadrant 58, 60, 62, and 64 is then subdivided into four quadrants comprising 16 bits×16 bits each such as, for example, the zero quadrant 58 is subdivided into a zero quadrant 66, a one quadrant 68, a two quadrant 70, and a three quadrant 72.

Referring next to FIG. 2D, the zero quadrant 66 is shown in enlarged detail for the sake of clarity. As previously described, each quadrant is further subdivided until down to a one-pixel size. Thus, the zero quadrant 66 is subdivided into a zero quadrant 74, a one quadrant 76, a two quadrant 78, and a three quadrant 80. The quadrants 74, 76, 78, and 80 are 8 pixels×8 pixels each and are further divided into 4 pixel×4 pixel quadrants, and finally into 2 pixel×2 pixel quadrants. If a change is found in a 2 pixel ×2 pixel quadrant, it is further subdivided into single pixels and the information therein is then encoded. For example, the zero quadrant 74 is divided into a zero quadrant 82, a one quadrant 84, a two quadrant 86, and a three quadrant 88. The zero quadrant 82 is further subdivided into a zero quadrant 90, a one quadrant 92, a two quadrant 94, and a three quadrant 96. A change is indicated in the zero quadrant 90 by asterisks and is thus subdivided into four quadrants each comprising a single pixel. The encoding of changes will be further described in greater detail utilizing the example shown in FIG. 2D.

Figure 3:
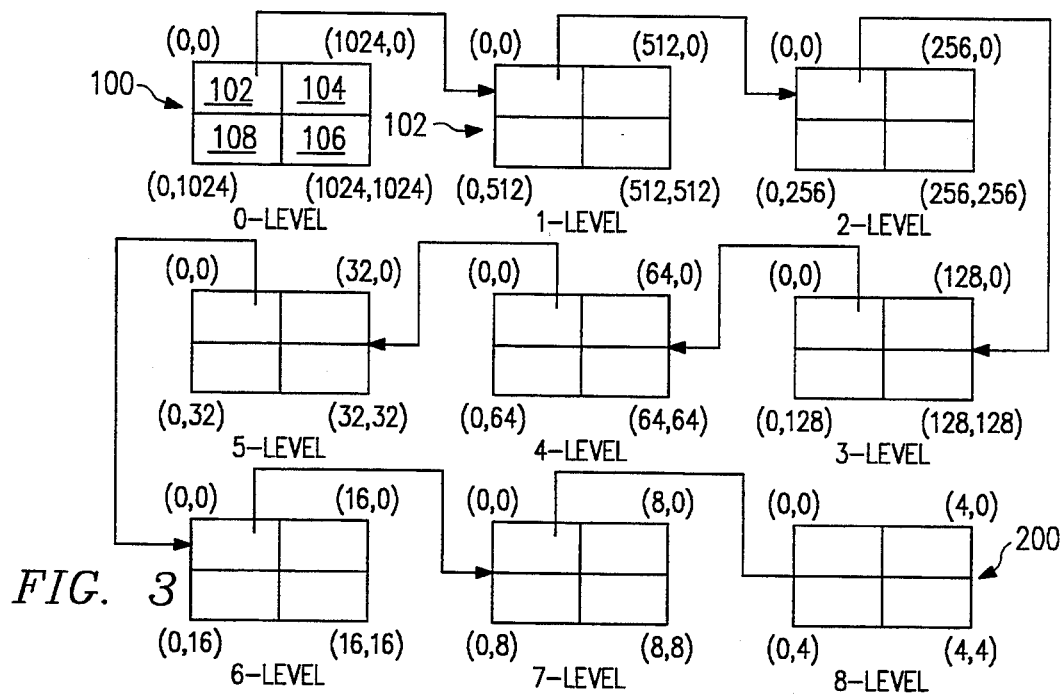
FIG. 3 graphically illustrates moving down from level to level.

Referring to FIG. 3, a schematic illustration of the sequential down-sizing and coordinates of quadrants is shown. As can be seen, there are nine levels comprising 0 through 8 for each video frame. The 0 level is the initial frame generally indicated by the reference numeral 100 divided into four quadrants, a zero quadrant 102, a one quadrant 104, a two quadrant 106, and a three quadrant 108, as previously described above. The zero quadrant 102 (as well as the one quadrant 104, the two quadrant 106, and the three quadrant 108) is subdivided into four additional quadrants which comprise the level 1. As previously described, each quadrant is further subdivided into four quadrants until reaching level 8 generally identified by the reference numeral 200 which comprises four 2 pixel×2 pixel quadrants. Subsequent to level 8, there is no further levels as each 2 pixel×2 pixel quadrant therein is divided into 1 pixel×1 pixel quadrants for the actual encoding of changes thereto.

In accordance with the present invention, a logical cursor points to the next quadrant for which a change may be described, if there is indeed a change for that quadrant. It is important to note that the quadrant being pointed to by the logical cursor can be of any size (i.e., it can be pointing to a 2 pixel×2 pixel quadrant or a 64 pixel×64 pixel quadrant, etc.). Which quadrant being pointed to currently is identified by two numbers: 1) a level number (0–8), and 2) a number of the quadrant within that level (i.e., zero, one, two, or three). The logical cursor is moved by using one or more of the following commands: 1) move one quadrant clockwise in the same level (MR1), 2) move two quadrants clockwise in the same level (MR2), 3) move three quadrants clockwise in the same level (MR3), 4) go down one level (MD), 5) go up one level (MU), 6) done with this level and one level above it, therefore, move up two levels (MU2), 7) done with this level and two levels above it, therefore, move up three levels (MU3), and 8) encode the changes found in the current eighth level (MDP). It is important to note that the MDP command is applied only at the eighth level. The MDP command specifies the exact pattern of change within the level. Subsequent to the MDP command, the exact pattern specification follows, i.e., the first four bits specify the pattern of change location indicating which 2 pixel×2 pixel quadrant has a change (level 8) followed by the pattern of change location within each 2 pixel×2 pixel quadrant that has a change therein. For the purpose of encoding, the eight commands listed above have been assigned a binary value of:

| Command | Binary Code |
| --- | --- |
| MD | 000 |
| MU | 001 |
| MU2 | 010 |
| MU3 | 011 |
| MR1 | 100 |
| MR2 | 101 |
| MR3 | 110 |
| MDP | 111 |

There are certain default logical cursor moves which do not need explicit commands. For example, when a quadrant is completed, the logical cursor automatically moves clockwise to the next quadrant at the same level. Whenever the cursor points to the three quadrant in a level, after completing any change in encoding therein, the logical cursor automatically moves up one level.

Referring to FIG. 4, each level and example commands are shown. Level 0 comprises the initial frame of 1,024 pixels×1,024 pixels in size subdivided into four quadrants each comprising 512 pixels×512 pixels. Level 1 then comprises the further subdividing of each of the 512 pixel×512 pixel quadrants of level 0. In order to move from level 0 to level 1, an MD (move down) command is given. Level 2 is reached by an MD command and comprises the subdividing of each 256 pixel×256 pixel quadrant found in level 1. Level 3 is reached by an MD command and comprises the 128 pixel×128 pixel quadrants of level 2 further subdivided into four quadrants of 64 pixels×64 pixels. Subsequent MD commands further subdivide each level until level 8 is reached. Once within level 8, an MDP command is created for each change found within a 2 pixel×2 pixel quadrant. After encoding any changes in a first 2 pixel×2 pixel quadrant, an MR1 (move right a quadrant) command is generated to move clockwise into the next 2 pixel×2 pixel quadrant. If no change is present in the next 2 pixel×2 pixel quadrant, instead of an MR1 an MR2 command is initiated. Similarly, if there is no change in the next 2 pixel×2 pixel quadrant, an MR3 command is initiated.

Referring to FIGS. 5A and 5B, an example of a command string is shown. Referring first to FIG. 5A, an example of an encoded command 120 is shown. The command comprises a frame designator 122 followed by blocks of commands. For example, block 124 contains an MD (move down) command (this would be actually represented as a binary number, i.e., −000) indicating a move from level 0 to level 1, as previously described above. At block 126, output data from level 8 is encoded. Block 128 then indicates that a change is present in the zero quadrant at the current level 8, with no changes in one, two, or three quadrants thereof. Block 130 further indicates that, within the zero quadrant of level 8 broken down further into 1 pixel×1 pixel quadrants, that there is a change in the two and three quadrants, with no changes in the zero and one quadrants (i.e., a 0 indicates no change and a 1 indicates a change). In block 130, the X designates a color change corresponding to the change in the two quadrant, while Y designates a color change corresponding to the three quadrant (the X and Y would be actually represented by a binary number). The command 120 would continue until all changes in the current frame are encoded.

Referring next to FIG. 5B, an example of the information within the command 120 is shown in greater detail referring to the example of FIGS. 2B, 2C, and 2D. Therefore, referring simultaneously to FIG. 5B and FIGS. 2B, 2C, and 2D, an example of the use of the present invention is shown. Once changes are detected in the current frame (t=1) as compared to the previous frame (t=0), a series of MD (move down) commands are given until arriving at a 4 pixel×4 pixel quadrant (level 8) in which a change has been detected. In FIG. 2D, the 4 pixel×4 pixel zero quadrant 82 is identified as having changes which are indicated by asterisks for the sake of simplicity. Within the four subdivision quadrants of the zero quadrant 82, it can be seen that there are changes in a zero quadrant 90, followed by no changes in a one quadrant 92, a two quadrant 94, and a three quadrant 96. Thus, using a 1 to indicate a change and a 0 to indicate no change, the coded instruction will be "1 0 0 0", as shown at 201 in FIG. 5B. Within the zero quadrant 90, it can be seen that there is no change in a zero or a one quadrant, and there are changes in a two and a three quadrant (again, shown as asterisks). Therefore, the command issued will be a "0 0 1 1", as shown at 202 in FIG. 5B. At command 202, the letter designations X and Y refer to a numerical value for a change in color found in that pixel from the previous frame. The X designates a color change found in the single pixel two quadrant, while the Y indicates a color change found in the single pixel three quadrant. Since there are no further changes in the zero quadrant 82, the logical cursor automatically repositions in the one quadrant 84. The MDP code for the one quadrant 84 will be "0 1 0 0", as indicated at 204 since there is no change in a zero quadrant 206, a change in a one quadrant 208, and no change in a two quadrant 210 or a three quadrant 212. The change in the one quadrant 208, as indicated with an asterisk, is coded as a "0 1 0 0" (as shown at 222 in FIG. 5B) since only a one quadrant 216 has a change, while a zero quadrant 214, a two quadrant 218, and a three quadrant 220 have no changes therein. Again, the X designated in command 222 represents a color change found in the one quadrant 216 as compared to the same quadrant in the previous frame.

Subsequent to the encoding of the one quadrant 84, the present invention automatically moves to the two quadrant 86 in which no change is found. Therefore, an MR1 (move right a quadrant) command 224 is issued to place the logical cursor in the three quadrant 88. An MDP command 226 is then issued followed by an encoding of "0 1 0 1" indicated at 228 due to no change found in a zero quadrant 230, a change found in a one quadrant 232, no change found in a two quadrant 234, and a change found in a three quadrant 236. The change found in the one quadrant 232 is encoded at 238 as a "1 0 1 0" since a zero quadrant 240 has a change, as does a two quadrant 244, while a one quadrant 242 and a three quadrant 246 have no changes. The three quadrant 236 is then encoded at 248 as a "0 1 0 1" since a zero quadrant 250 as well as a two quadrant 254 each have no changes therein, while a one quadrant 252 and a three quadrant 256 each have changes therein.

Since the three quadrant 88 is the last subdivided quadrant of the zero quadrant 74, the present invention will automatically move up to the quadrant 66 and an MD command 258 will result in placement of the logical cursor in the one quadrant 76. Since there is no change found in a zero or a one quadrant of the one quadrant 76, an MR2 (move right 2 quadrants) command 260 is issued to position the logical cursor in a two quadrant 261. An MDP command 262 is then issued which results in an encoding of "0 0 0 1" shown at 264 as a result of no changes in a zero quadrant 266, a one quadrant 268, and a two quadrant 270, while there is a change in a three quadrant 272. The encoding of the three quadrant 272 shown at 274 is "0 1 0 1" as there is no change in a zero and a two quadrant, while there are changes in a one and a three quadrant thereof. Since there is no change in a three quadrant 276 of the one quadrant 76 as determined by the automatic MR1 of the logical cursor, the present invention moves up into the zero quadrant 66 once again. An MU command 278 is then issued to position the logical cursor in the two quadrant 78. Since there is no change in the two quadrant 78, an MR1 command 280 is issued to place the logical cursor in the three quadrant 80. An MD command 282 moves the logical cursor into a zero quadrant 284 thereof. Since there is no change in the zero quadrant 284, a one quadrant 286, or a two quadrant 288 of the three quadrant 80, an MR3 command 290 is issued to position the logical cursor in a three quadrant 292 thereof. An MDP command 294 then results in an encoding as shown at 296 of "0 0 0 1" since there is no change in a zero quadrant 298, a one quadrant 300, and a two quadrant 302, while there is a change in a three quadrant 304. The changes indicated by asterisks in the three quadrant 304 result in an encoding as shown at 306 of "0 1 0 1" as there is no change in a zero quadrant, a change in a one quadrant, no change in a two quadrant, and a change in a three quadrant thereof. Assuming there are no further changes in the frame 30 (see FIG. 2B), an MU2 command 310 moves the logical cursor from the zero quadrant 66 to the zero quadrant 58. Another MU2 command 312 then moves the logical cursor from the zero quadrant 58 to the zero quadrant 48. A third MU2 command 314 moves the logical cursor from the zero quadrant 48 to the zero quadrant 32, and a final MU command 316 moves the logical cursor from the zero quadrant 32 to the frame 30 at level 0 indicating completion of that frame.

Figure 6:
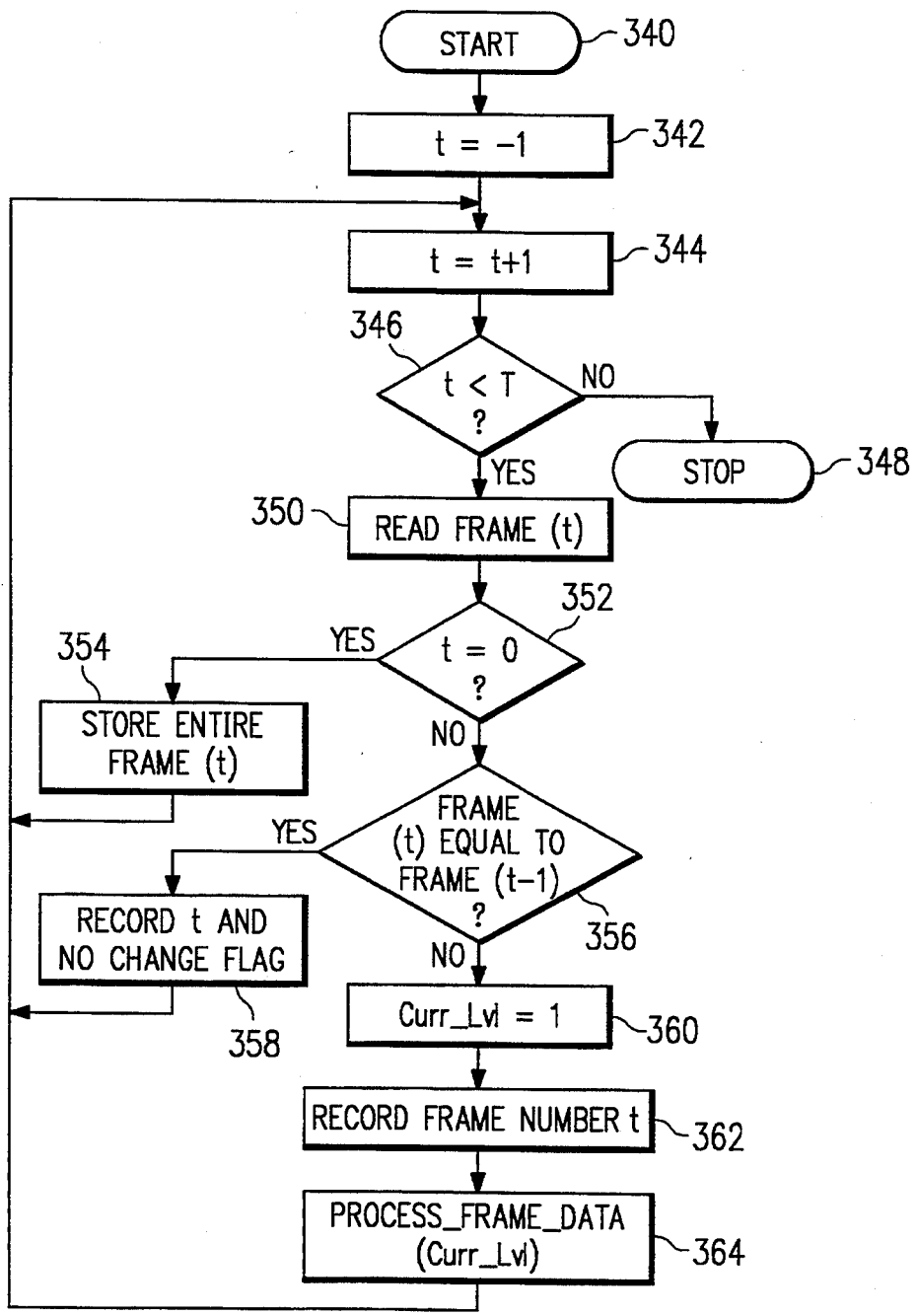
FIG. 6 is a simplified flowchart of the video encoding method in accordance with the present invention.

Referring next to FIG. 6, an abbreviated flowchart of the method in accordance with the present invention is illustrated. In FIGS. 6 through 12, a 't' indicates the current frame number, while a 'T' indicates the total number of frames in the video clip. After starting at 340, the current frame number t is set equal to −1 at block 342. At block 344, the current frame number is incremented by 1 (ensures that the first frame in the video is checked). At decision block 346, it is then determined whether the current frame number is less than the total number of frames in the video clip. If the response to decision block 346 is no, the present invention stops at 348. If the response to decision block 346 is yes, the current frame is read at block 350. At decision block 352, it is decided whether or not the frame number equals 0. If the response to decision block 352 is yes (i.e., the first frame of the video clip), the entire frame is stored at block 354. If the response to decision block 352 is no, it is determined at decision block 356 whether or not the current frame is the same as the previous frame. If the response to decision block 356 is yes (i.e., the two frames are identical), the frame number and a no-change flag are recorded at block 358. If the response to decision block 356 is no, the current working level of the logical cursor is set to 1 at block 360. The frame number is recorded at block 362 and the frame encoding occurs for the current working level of the cursor at block 364. Subsequent to block 364, block 358, or block 354, the present invention returns to block 344 where the next frame is then considered.

Figure 7A:
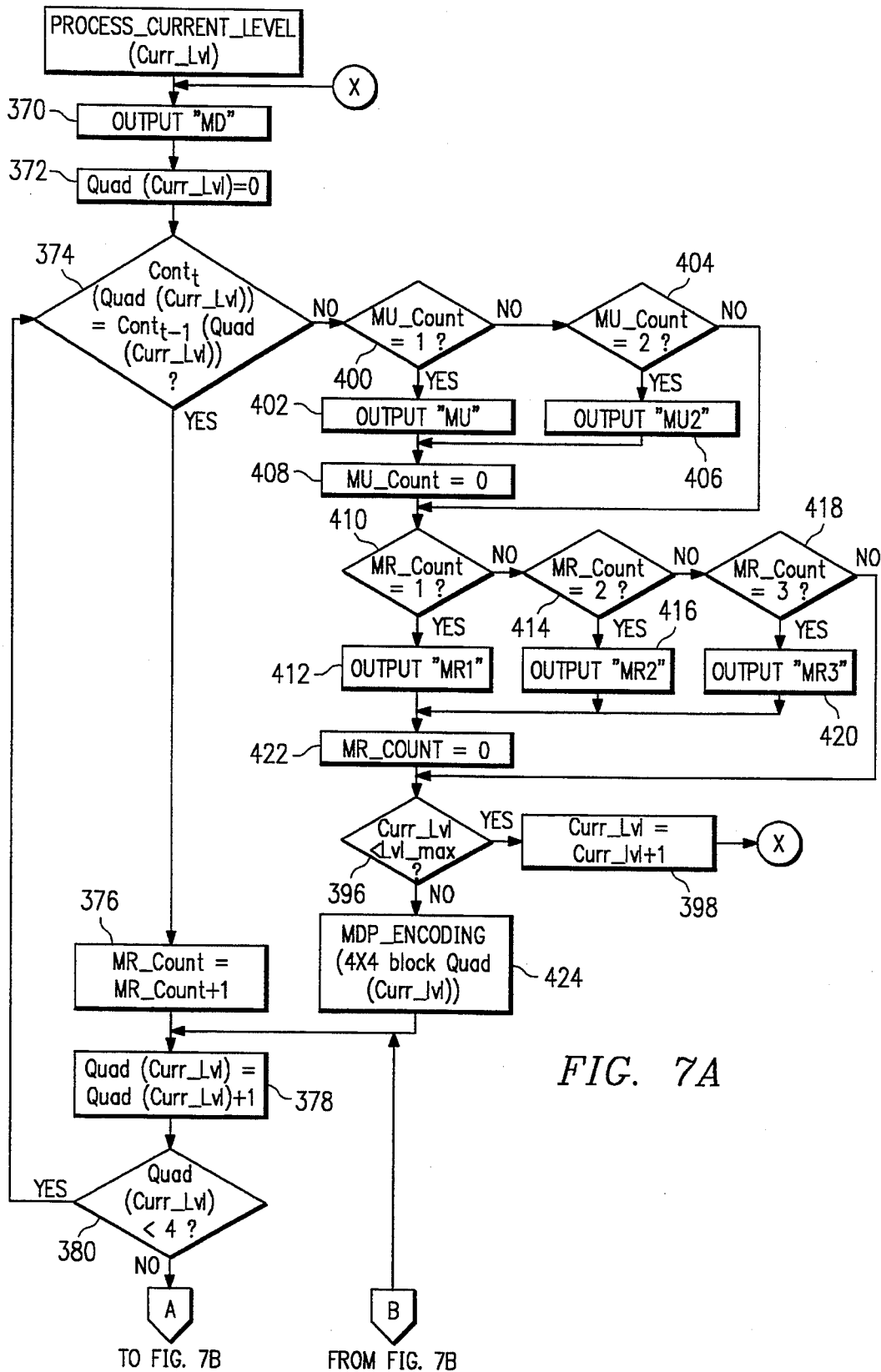

Referring to FIGS. 7A and 7B, block 364 of FIG. 6 is shown in greater detail. At block 370, an MD command is output. The current quadrant of the current working level is set equal to 0 (i.e., the cursor is positioned at the zero quadrant of the current level) at block 372. At decision block 374, it is determined whether or not the contents of the quadrant of the current level of the frame t is equal to the contents of the same quadrant of the current level of the previous frame. If the response to decision block 374 is yes (i.e., the current frame is the same as the previous frame), an MR command is incremented by 1 at block 376 to move the logical cursor to the next clockwise most quadrant of the current level. At block 378, the count for the quadrant of the current level is incremented by 1. At decision block 380, it is determined whether or not the quadrant of the current level is less than 4. If the response to decision block 380 is yes, the present invention returns to decision block 374. If the response to decision block 380 is no, it is determined at decision block 382 whether or not the move right count is equal to 0. If the response to decision block 382 is no, the move up count is incremented by 1 at block 384. At decision block 386, it is determined whether or not the move up count is equal to 3. If the response to decision block 386 is yes, a command MU3 is output at block 388 and the move up count is set equal to 0. If the response to decision block 386 is no, or after block 388, the move right count is set equal to 0 at block 390. If the response to decision block 382 is yes or subsequent to block 390, the current level is set equal to the current level minus 1 at block 392. At decision block 394, it is determined whether or not the current level is equal to 0. If the response to decision block 394 is yes, the present invention returns to block 364 in FIG. 6, after which a return to block 344 of FIG. 6 occurs. If the response to decision block 394 is no, the present invention returns to block 378 as previously described above.

Returning to decision block 374, if the response thereto is no, it is determined at decision block 400 whether or not the move up count equals 1. If the response to decision block 400 is yes, a MU command is output at block 402. If the response to decision block 400 is no, it is determined at decision block 404 whether or not the move up count is equal to 2. If the response to decision block 404 is yes, a command MU2 is output at block 406. Subsequent to block 402 or block 406, the move up count is set equal to 0 at block 408. If the response to decision block 404 is no (i.e., the move up count already equals 0), or after block 408, it is determined at decision block 410 whether or not the move right count equals 1. If the response to decision block 410 is yes, an MR1 command is output at block 412. If the response to decision block 410 is no, it is determined at decision block 414 whether or not the move right count equals 2. If the response to decision block 414 is yes, an MR2 command is output at block 416. If the response to decision block 414 is no, it is determined at decision block 418 whether or not the move right count equals 3. If the response to decision block 418 is yes, an MR3 command is output at block 420. Subsequent to blocks 412, 416, or 420, the move right count is set equal to 0 at block 422. If the response to decision block 418 is no or after block 422, it is determined at decision block 396 whether or not the current level is less than the maximum level, which is 8. If the response to decision block 396 is yes, the current level is incremented by 1 at block 398, followed by a return to block 370. If the response to decision block 396 is no, MDP encoding occurs at block 424 for the 4 pixels×4 pixels of the current level quadrant. Subsequent to MDP encoding at block 424 (as will be subsequently described in greater detail in FIGS. 8 and 9), the present invention proceeds to block 378 as previously described above.

Figure 8:
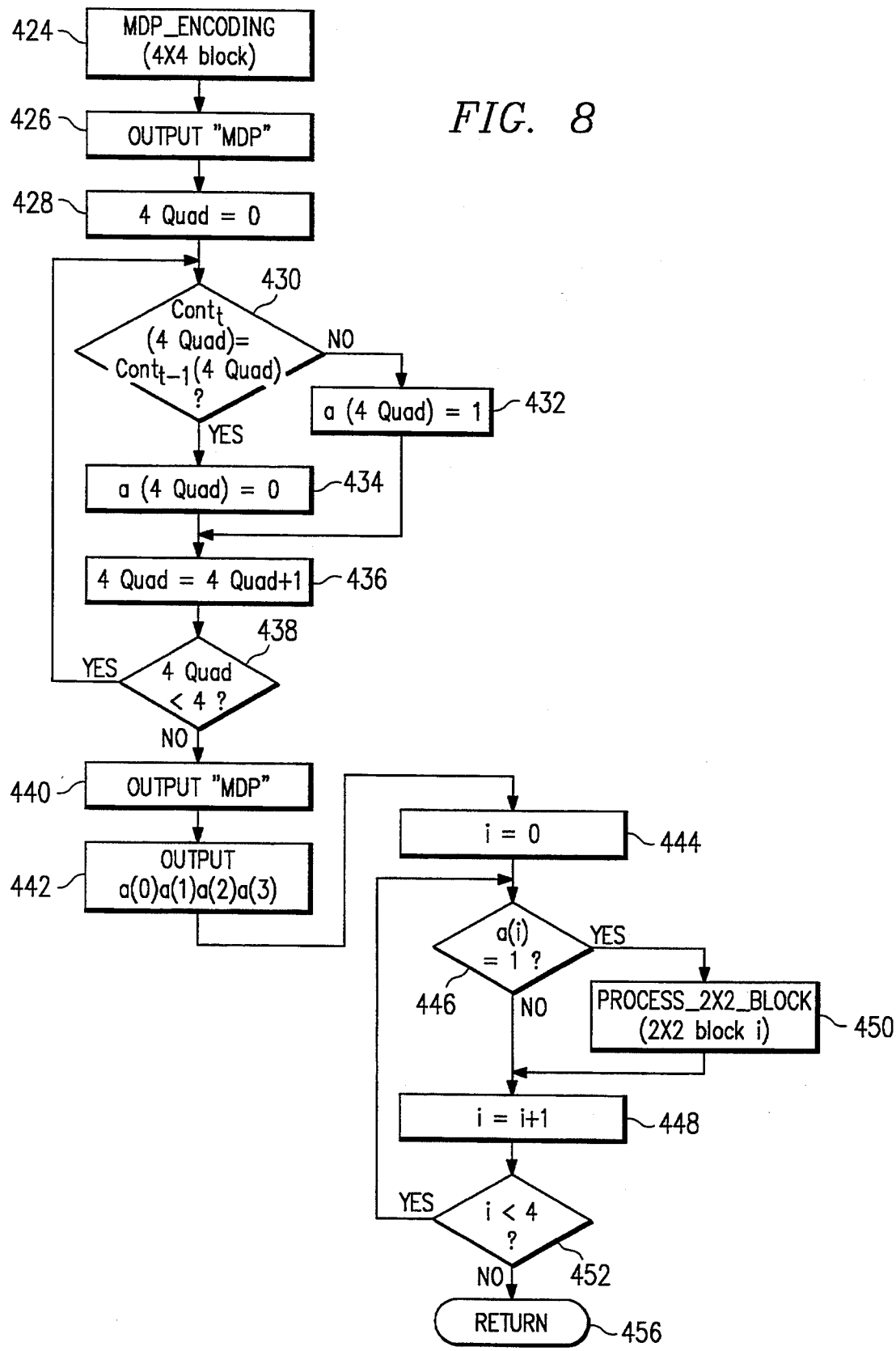
FIG. 8 is a detailed flowchart of the MDP encoding of a 4 pixel×4 pixel quadrant.

Referring to FIG. 8, the MDP encoding in block 424 of FIG. 7 is shown in greater detail. At block 426, an MDP command is output. At block 428, the logical cursor is positioned in the zero quadrant of the 4 pixel×4 pixel quadrant. At decision block 430, it is determined whether or not the contents of the zero quadrant of the 4 pixel×4 pixel quadrant in the current frame is equal to the contents of the same quadrant in the previous frame. If the response to decision block 430 is no (there is a change), that quadrant (the zero quadrant at this point) is marked as having a change with a 1. If the response to decision block 430 is yes (both quadrants are identical frame-to-frame), that quadrant is marked as having no change with a 0. Subsequent to block 432 or block 434, the current quadrant is incremented by 1 (i.e., move from the zero quadrant to the one quadrant) at block 436. It is then determined at decision block 438 whether or not the current quadrant is less than 4. If the response to decision block 438 is yes (i.e., all four quadrants, zero, one, two, and three, have not been checked), the present invention returns to decision block 430. If the response to decision block 438 is no (all four quadrants have been checked), an MDP command is output at block 440. At block 442, the first MDP command identifying which of the 2 pixel×2 pixel quadrants have changes is output. At block 444, the logical cursor is positioned at the zero quadrant of the 4 pixel×4 pixel quadrant. At decision block 446, it is determined whether or not the quadrant is marked as having a change or not (i.e., a 1 or a 0). If the response to decision block 446 is yes, the 2 pixel×2 pixel quadrant is further evaluated for individual pixel changes at block 450, as will be subsequently described in greater detail. If the response to decision block 446 is no or after block 450, the logical cursor is incremented by 1 to move clockwise to the next 2 pixel×2 pixel quadrant at block 448. It is then determined at decision block 452 whether or not the current quadrant is less than 4. If the response to decision block 452 is yes, the present invention returns to decision block 446. If the response to decision block 452 is no, the present invention returns at 456 to block 378 of FIG. 7.

Figure 9:
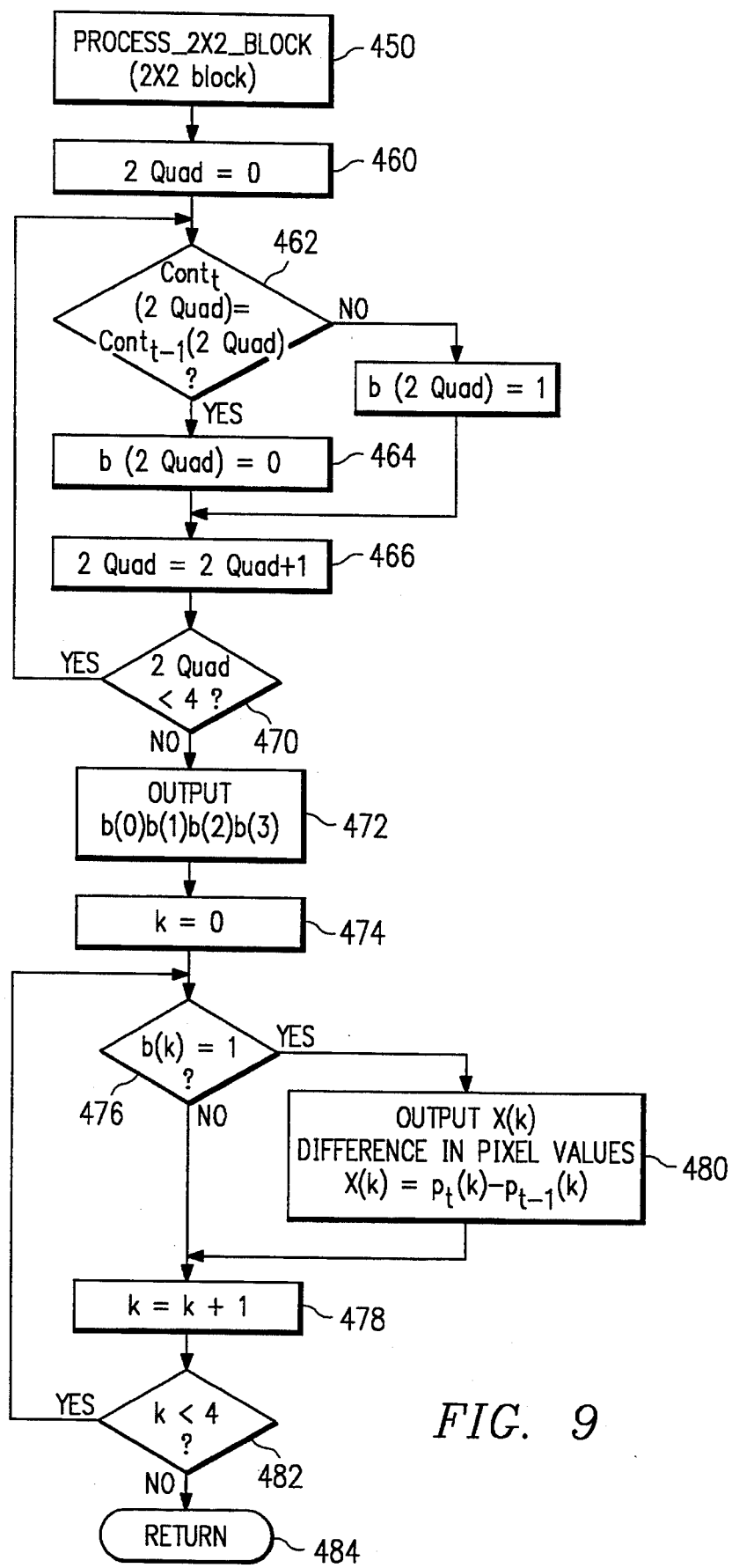
FIG. 9 is a detailed flowchart of the processing of a 2 pixel×2 pixel quadrant.

Referring to FIG. 9, block 450 of FIG. 8 is shown in greater detail. At block 460, the logical cursor is positioned at the zero quadrant of the current 2 pixel×2 pixel quadrant. At decision block 462, it is determined whether or not the contents of the current 1 pixel×1 pixel quadrant are the same as the contents of the same 1 pixel×1 pixel quadrant of the previous frame. If the response to decision block 462 is yes (pixels are the same), a no change status is marked with a 0 at block 464. If the response to decision block 462 is no, the change status is marked by a 1 at block 468. At block 466, the 1 pixel×1 pixel quadrant is incremented clockwise by 1. It is determined at decision block 470 whether the current 1 pixel×1 pixel quadrant is less than 4 or not. If the response to decision block 470 is yes, the present invention returns to decision block 462. If the response to decision block 470 is no, the command indicating a change or no change for each 1 pixel×1 pixel quadrant is output at block 472. At block 474, the same four 1 pixel×1 pixel quadrants are rechecked starting at the zero quadrant for the value of the actual color change (based on 0–256 colors). At decision block 476, it is determined whether or not there was a change (i.e., a 1 recorded) for that 1 pixel×1 pixel quadrant. If the response to decision block 476 is yes (i.e., there is a change in that 1 pixel×1 pixel quadrant), the actual color change is calculated by comparing the encoded value of the same 1 pixel×1 pixel quadrant of the previous frame with the current frame. That value is output at block 480. Subsequent to block 480 or if the response to decision block 476 is no, the current 1 pixel ×1 pixel quadrant is incremented by 1 quadrant clockwise at block 478. It is then determined at decision block 482 whether or not the current 1 pixel×1 pixel quadrant is less than 4. If the response to decision block 482 is yes, the present invention returns to decision block 476. If the response to decision block 482 is no, the present invention returns at 484 to block 448 in FIG. 8.

Figure 10A:
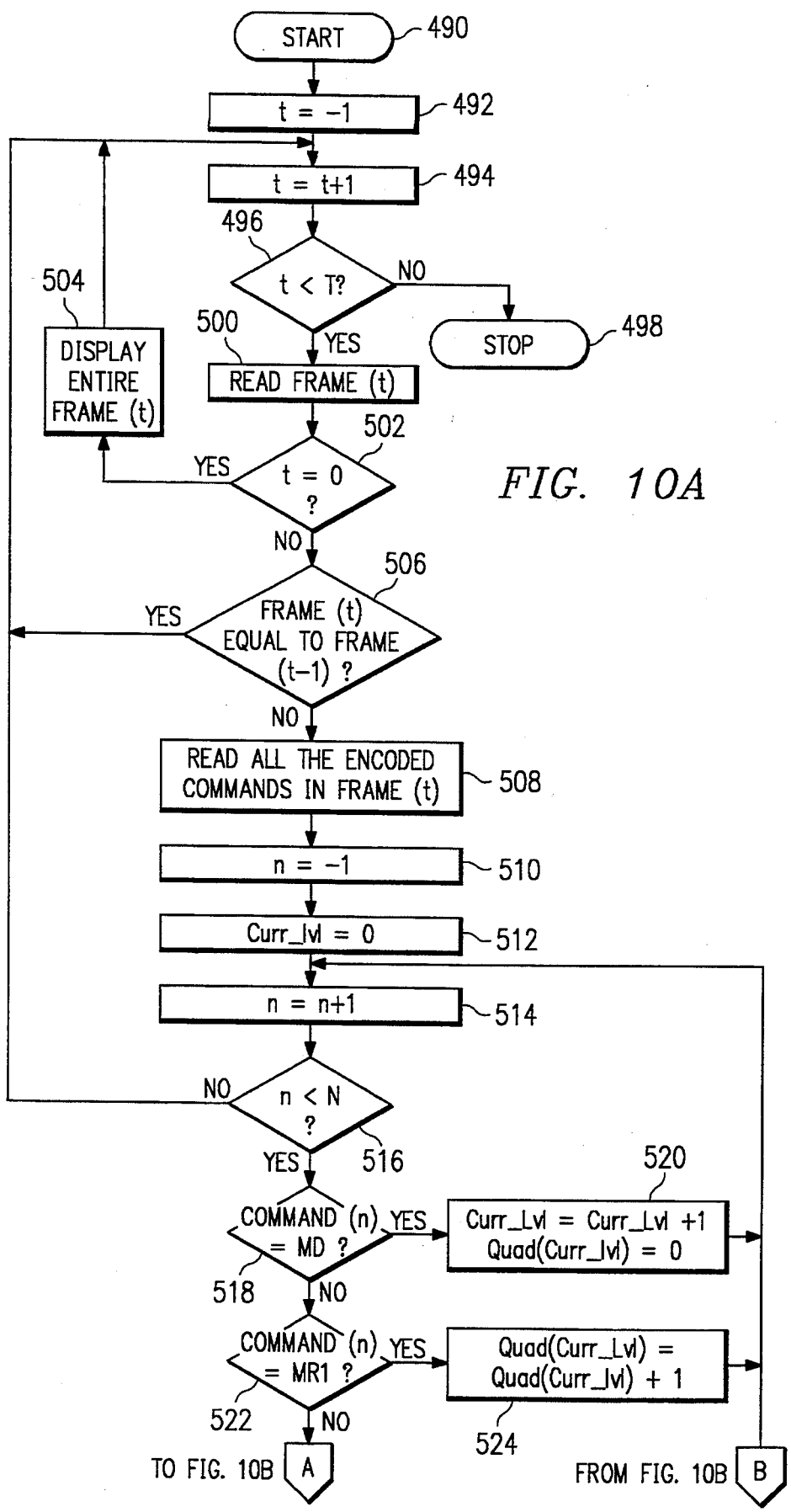
FIGS. 10A, 10B, and 10C are flowcharts of video decoding in accordance with the present invention.
Figure 10B:
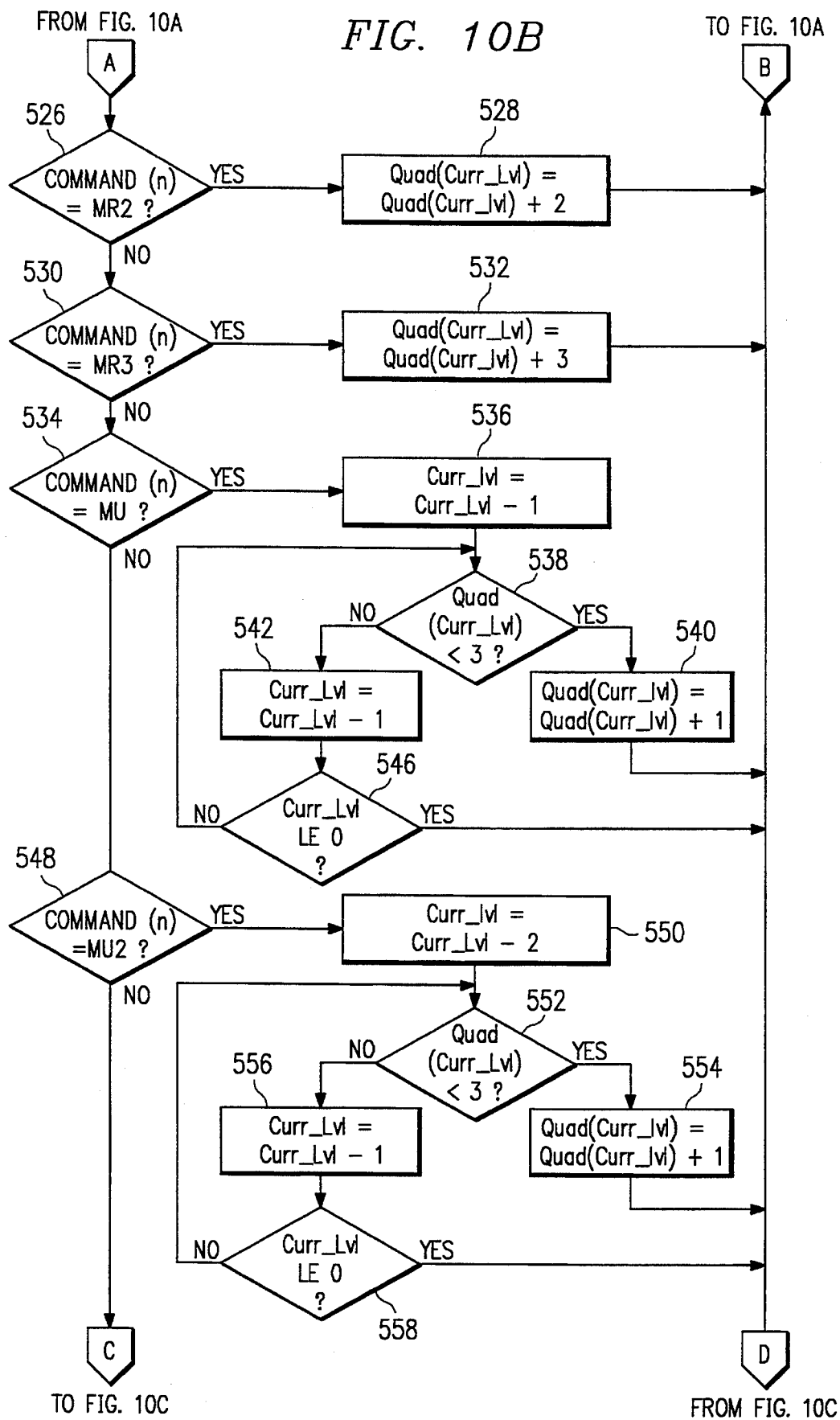
Figure 10C:
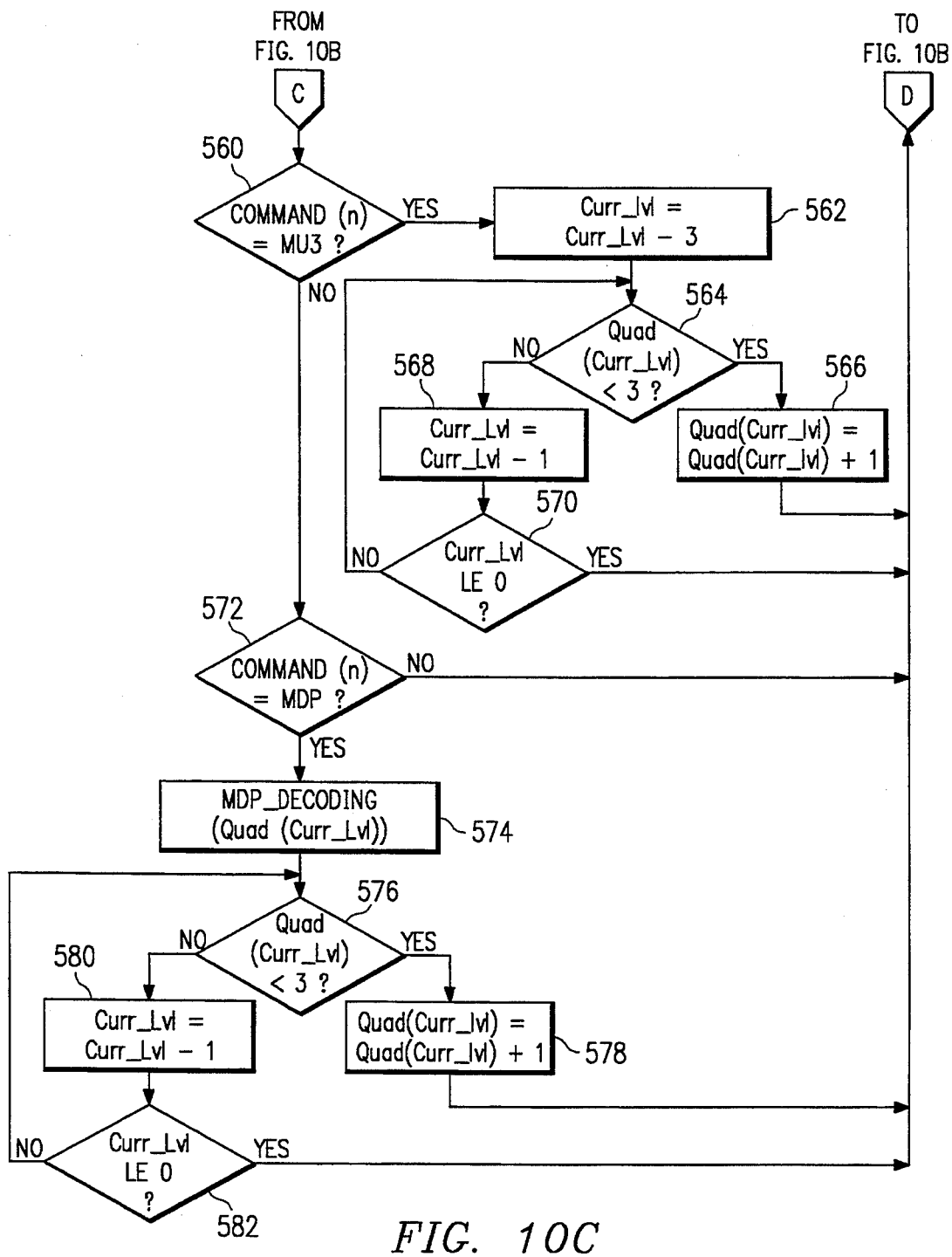

Referring to FIGS. 10A, 10B, and 10C, flowcharts illustrate decoding of a compressed video utilizing the present invention. After starting at 490, the current frame t is set equal to −1 at block 492. At block 494, the current frame t is incremented by 1 (ensuring the first frame is checked). At decision block 496, it is determined whether or not the current frame number is less than the total number of frames in the video clip. If the response to decision block 496 is no, the present invention stops at 498. If the response to decision block 496 is yes, the current frame is read at block 500. At decision block 502, it is determined whether or not the current frame number equals 0. If the response to decision block 502 is yes, the entire frame is displayed at block 504 followed by a return to block 494. If the response to decision block 502 is no, it is determined at decision block 506 whether or not the current frame is equal to the previous frame. If the response to decision block 506 is yes, the present invention returns to block 494. If the response to decision block 506 is no, all the encoded commands N in the current frame are read at block 508 (where N=total number of encoded commands for the frame t). At block 510, the current command (n) is set equal to −1. At block 512, the current level is set equal to 0. At block 514, the current command is incremented by 1 (ensures that the first command is checked). At decision block 516, it is determined whether or not the current command is less than the total number of commands for the frame. If the response to decision block 516 is no, the present invention returns to block 494, as previously described above. If the response to decision block 516 is yes, it is determined whether or not the current command is an MD command at decision block 518. If the response to decision block 518 is yes, the current level is incremented by 1 and the logical cursor is positioned at the zero quadrant of the current level at block 520, followed by a return to block 514. If the response to decision block 518 is no, it is determined at decision block 522 whether or not the current command is an MR1 command. If the response to decision block 522 is yes, the logical cursor is moved one quadrant clockwise in the current level at block 524 followed by a return to block 514. If the response to decision block 522 is no, it is determined at decision block 526 (FIG. 10B) whether or not the current command is an MR2. If the response to decision block 526 is yes, the logical cursor is moved two quadrants clockwise in the current level at block 528 followed by a return to block 514. If the response to decision block 526 is no, it is determined at decision block 530 whether or not the current command is an MR3. If the response to decision block 530 is yes, the logical cursor is moved three quadrants clockwise in the current level at block 532 followed by a return to block 514. If the response to decision block 530 is no, it is determined at decision block 534 whether or not the current command is an MU command. If the response to decision block 534 is yes, the current level is set equal to the current level minus 1 at block 536 (i.e., move up one level). It is then determined at decision block 538 whether or not the quadrant of the current level is less than 3. If the response to decision block 538 is yes, the quadrant of the current level is incremented by 1 at block 540 followed by a return to block 514. If the response to decision block 538 is no, the current level is set equal to the current level minus 1 at block 542. It is then determined at decision block 546 whether or not the current level is less than or equal to 0. If the response to decision block 546 is no, the present invention returns to decision block 538. If the response to decision block 546 is yes, the present invention returns to block 514.

Returning to decision block 534, if the response thereto is no, it is determined at decision block 548 whether or not the current command is an MU2 command. If the response to decision block 548 is yes, the current level is set equal to the current level minus 2 at block 550. It is then determined at decision block 552 whether or not the quadrant of the current level is less than 3. If the response to decision block 552 is yes, the quadrant of the current level is incremented by 1 at block 554 followed by a return to block 514. If the response to decision block 552 is no, the current level is set equal to the current level minus 1 at block 556. At decision block 558 it is then determined whether or not the current level is less than or equal to 0. If the response to decision block 558 is yes, the present invention returns to block 514. If the response to decision block 558 is no, the present invention returns to decision block 552.

Returning to decision block 548, if the response thereto is no, it is determined at decision block 560 (FIG. 10C) whether or not the current command is an MU3 command. If the response to decision block 560 is yes, the current level is set equal to the current level minus 3 at block 562. It is then determined at decision block 564 whether or not the quadrant of the current level is less than 3. If the response to decision block 564 is yes, the quadrant of the current level is incremented by 1 at block 566 followed by a return to block 514. If the response to decision block 564 is no, the current level is set equal to the current level minus 1 at block 568. It is then determined at decision block 570 whether or not the current level is less than or equal to 0. If the response to decision block 570 is yes, the present invention returns to block 514. If the response to decision block 570 is no, the present invention returns to decision block 564.

Returning to decision block 560, if the response thereto is no, it is determined at decision block 572 whether or not the current command is an MDP command. If the response to decision block 572 is no, the present invention returns to block 514. If the response to decision block 572 is yes, MDP decoding of the quadrant of the current level occurs at block 574, as will be subsequently described in greater detail. It is then determined at decision block 576 whether or not the quadrant of the current level is less than 3. If the response to decision block 576 is yes, the quadrant of the current level is incremented by 1 at block 578 followed by a return to block 514. If the response to decision block 576 is no, the current level is set equal to the current level minus 1 at block 580. It is then determined at decision block 582 whether or not the current level is less than or equal to 0. If the response to decision block 582 is yes, the present invention returns to block 514. If the response to decision block 582 is no, the present invention returns to decision block 576.

Figure 11:
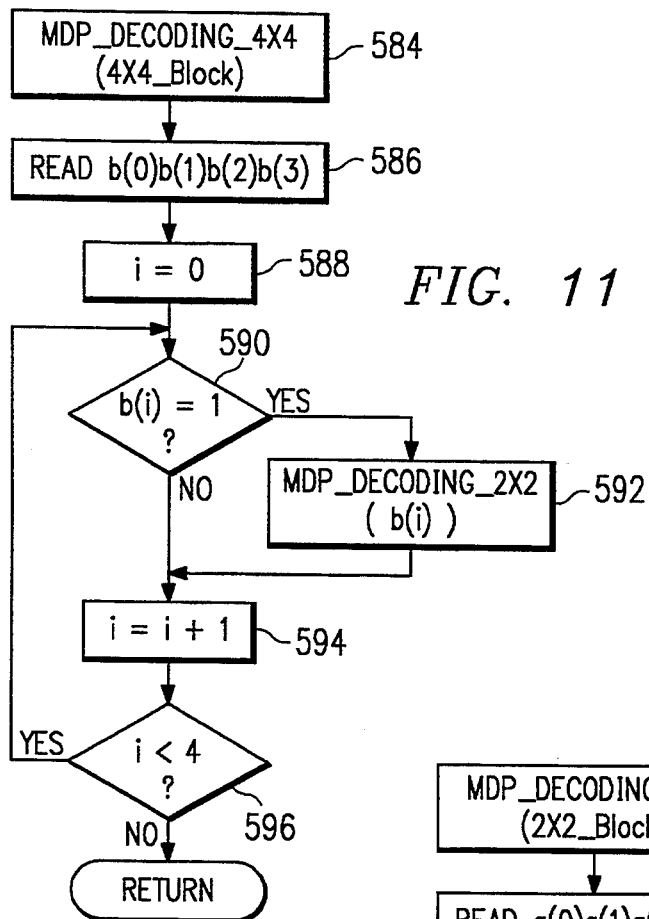
FIG. 11 is a flowchart of the MDP decoding of a 4 pixel ×4 pixel quadrant.

Referring to FIG. 11, the MDP decoding of block 574 in FIG. 10C is illustrated in greater detail. At block 584, MDP decoding of a 4 pixel×4 pixel quadrant (block) occurs. At block 586, values b(0), b(1), b(2), and b(3) are read (i.e., whether there is a change (indicated by a 1) in each of the four 2 pixel×2 pixel quadrants of the 4 pixel×4 pixel quadrant). The logical cursor is then positioned at the zero quadrant of the first 2 pixel×2 pixel quadrant (b(0)) of the 4 pixel×4 pixel quadrant at block 588. It is then determined at decision block 590 whether or not b(i) equals 1 (i.e., does the current 2 pixel×2 pixel quadrant have a change indicated by a 1 therein). If the response to decision block 590 is yes, MDP decoding of the 2 pixel×2 pixel quadrant occurs at block 592, as will be subsequently described in greater detail. If the response to decision block 590 is no or subsequent to block 592, i is set equal to i plus 1 (the logical cursor is moved one quadrant clockwise) at block 594. It is then determined at decision block 596 whether or not i is less than 4 (i.e., all four quadrants have been evaluated or not). If the response to decision block 596 is yes, the present invention returns to decision block 590. If the response to decision block 596 is no, the present invention returns to block 576 in FIG. 10C.

Figure 12:
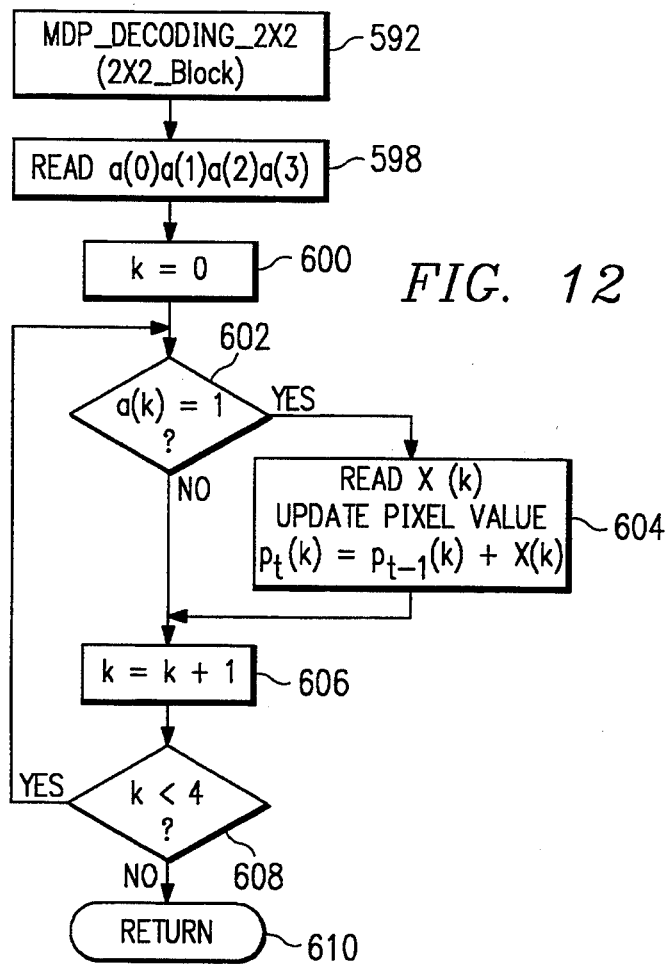
FIG. 12 is a flowchart of the MDP decoding of a 2 pixel ×2 pixel quadrant.

Referring to FIG. 12, the MDP decoding of a 2 pixel×2 pixel quadrant as shown in block 592 of FIG. 11 is shown in greater detail. At block 598, values a(0), a(1), a(2), and a(3) are read (i.e., whether there is a change (indicated by a 1) in each of the four pixels in the 2 pixel×2 pixel quadrant). At block 600, k is set equal to 0 in order to recheck the four pixels for an actual color change value. It is then determined at decision block 602, whether or not a(k) equals 1 (i.e., is there a change in the single pixel indicated by a 1). If the response to decision block 602 is yes, X(k) is read (i.e., the actual color difference) and the pixel color value is updated (color of the previous pixel is changed by the X(k) value to obtain the correct color of the current pixel) at block 604. If the response to decision block 602 is no or subsequent to block 604, k is set equal to k plus 1 (logical cursor moves clockwise to the next single pixel quadrant). It is then determined at decision block 608 whether or not k is less than 4. If the response to decision block 608 is yes, the present invention returns to decision block 602. If the response to decision block 608 is no, the present invention returns at 610 to block 594 of FIG. 11.

In summary, the present invention provides a method of encoding changes from frame to frame which allows video compression utilizing less storage than the prior art. The encoded commands require less memory due to the novel approach to encoding thereof as disclosed herein.

Although the present invention has been particularly shown and described with reference to a preferred embodiment, it will be understood by those skilled in the art that various changes in form and detail may be made without departing from the spirit and the scope of the invention.

What we claim is:

1. A method of reducing required memory storage space on a data processing system for a digitized video by defining a color change in a subsequent video frame from a previous video frame, comprising the steps of:

subdividing the previous and subsequent video frame each into a plurality of levels comprising progressively smaller quadrants down to a pre-defined size;

defining a location of a color change in the subsequent frame compared to the previous frame by a level designator and a quadrant designator; and storing in a memory said change as said level designator, said quadrant designator and a color designator.

2. The method of claim 1, further comprising the step of:

automatically maneuvering a logical cursor through said plurality of levels and from quadrant to quadrant therein by a predefined pattern, wherein any color change is located by said cursor.

3. The method of claim 2, wherein said step of automatically maneuvering includes the steps of:

moving said logical cursor clockwise from quadrant to quadrant in a level; and moving to a lower level if a change is detected in any of said quadrants.

4. A method of reducing required memory storage space on a data processing system for a digitized video by defining a color change in one frame compared to a previous frame, comprising the steps of:

subdividing the one frame and the previous frame each into a plurality of levels comprising progressively smaller quadrants down to a pre-defined size;

defining a location of the change by a plurality of commands which maneuver a logical cursor through said progressively smaller quadrants to a single pixel containing the change; and storing in a memory the change as a color difference and said plurality of commands.

5. The method of claim 4, wherein said step of subdividing comprises:

creating nine of said levels wherein said ninth level comprises four 2 pixel×2 pixel quadrants.

6. The method of claim 5, further comprising the steps of:

subdividing each of said 2 pixel×2 pixel quadrants into four 1 pixel by 1 pixel quadrants.

7. A data processing system for reducing required memory storage space for a digitized video by defining a color change in one frame compared to a previous frame, comprising:

means for subdividing the one frame and the previous frame each into a plurality of levels comprising progressively smaller quadrants down to a predefined size;

means for defining a location of the change by a plurality of commands which maneuver a logical cursor through said progressively smaller quadrants to a single pixel containing the change; and means for storing in a memory the change as a color difference and said plurality of commands.

8. The system of claim 7, wherein said means for subdividing comprises:

means for creating nine of said levels wherein said ninth level comprises four 2 pixel×2 pixel quadrants.

9. The system of claim 8, further comprising:

means for subdividing each of said 2 pixel×2 pixel quadrants into four 1 pixel×1 pixel quadrants.

* * * * *